Figures 1, 2, 3, 4:
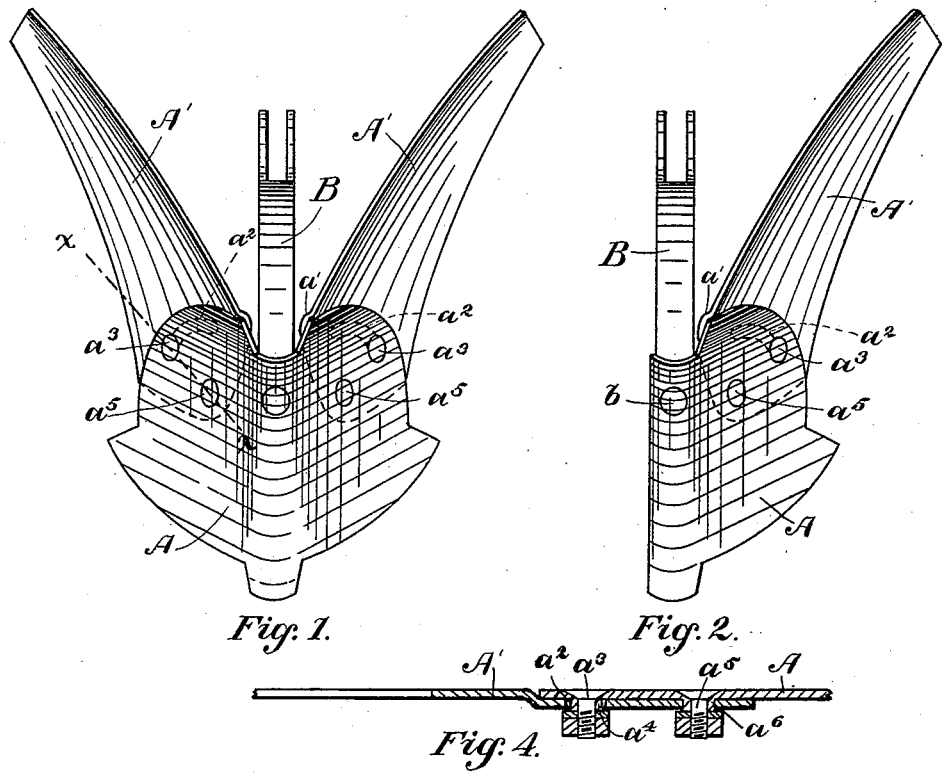

(No Model.)

S. L. ALLEN.
FURROWER, HILLER, AND RIDGER COMBINED.

No. 463,611. Patented Nov. 24, 1891.

Witnesses
Albert E. Leech
E. H. Gilman

Inventor
Samuel L. Allen
by W. B. H. Down
atty.

UNITED STATES PATENT OFFICE.

SAMUEL L. ALLEN, OF CINNAMINSON, NEW JERSEY.

FURROWER, HILLER, AND RIDGER COMBINED.

SPECIFICATION forming part of Letters Patent No. 463,611, dated November 24, 1891.

Application filed May 4, 1891. Serial No. 391,543. (No model.)

*To all whom it may concern:*

Be it known that I, SAMUEL L. ALLEN, a citizen of the United States, residing at Cinnaminson, in the county of Burlington and State of New Jersey, have invented a certain new and Improved Furrower, Hiller, and Ridger Combined, of which the following is a full specification.

My invention consists of an improved cultivator-tooth having adjustable wings adapting it for use as a furrower, hiller, or ridger, the adjustability of the wings rendering it possible to make furrows of any reasonable width or depth or a ridge of any desired height. Moreover, the wings are detachable, which allows the tooth itself to be used without the wings for a great variety of uses in ordinary cultivating.

Referring to the accompanying drawings, Figure 1 shows in front perspective my improved tool arranged with double wings. Fig. 2 shows a modified form thereof in which a single wing only is used. Fig. 3 is a central longitudinal section through the tooth and standard; and Fig. 4 is an enlarged sectional view on line $x\, x$, Fig. 1.

A is the body of the tooth, which is secured to the standard B by means of the bolt $b$ and its nut $b'$. This tooth may be made double or single, as shown in Figs. 1 and 2, respectively, having either two mold-boards or one. The standard of the tooth is secured by bolts in the ordinary manner to the bar L of a cultivator-frame. Each mold-board has pivotally connected thereto an adjustable wing A'. To this end the mold-board has a hole, in which fits the head of a bolt $a^5$, about the center of which bolt the adjustable wing turns, the head of the bolt being preferably countersunk flush with the face of the tooth. The rear of each mold-board is cut in the arc of a circle struck from the center of the bolt $a^5$, and the adjustable wing is struck up in the form shown in Fig. 3, with a shoulder $a'$ correspondingly curved to fit the circular shape of the mold-board, so that the wing may be readily turned about its pivot.

$a^6$ is a sleeve or collar struck from the material of the tooth A to surround the bolt $a^5$. This sleeve projects downward through the wing A', forming a pivot, about which the wing turns, and fitting a hole in said wing, as shown in Fig. 4. Each wing A' is, moreover, provided with a slot $a^2$ in the arc of a circle, in which slot a bolt-sleeve $a^4$, struck from the material of the tooth A, similar to the sleeve $a^6$, engages. Through this sleeve $h^4$ passes the bolt $a^3$, the head of which, like that of the bolt $a^5$, is preferably flush with the face of the mold-board. The bolts $a^3$ and $a^5$ are provided with suitable nuts and washers.

The construction is such that by loosening the nuts of both bolts $a^3$ and $a^5$ the wing A' may be moved up or down around its pivotal sleeve $a^6$, the slot $a^2$ moving over the sleeve $a^4$, and the wing may be clamped in any position by tightening the nuts in a manner readily seen from the drawings.

When the wings are raised as high as possible, in the position shown in Fig. 1, the furrow made is very narrow and deep, if desired. When spread out nearly horizontal, they make a wider furrow. The single form shown in Fig. 2 is commonly used in pairs side by side with the mold-board and its wings pointing inward. An implement having teeth thus attached is useful for ridging or covering, the height of the ridge depending on the position of the adjustable wings.

By removing the bolts $a^3$ $a^5$ the wings may be detached and the tooth used without the wings for many useful purposes in cultivating.

I claim—

A combined furrower, hiller, and ridger consisting of a tooth A, provided with a mold-board cut in the rear to the arc of a circle and having bolt-sleeves $a^4$ $a^6$, in combination with a detachable angularly-adjustable wing A', having a circular shoulder $a'$ and a slot $a^2$, a pivotal bolt $a^5$, and a clamping-bolt $a^3$, fitting said bolt-sleeves, all arranged and operating substantially as and for the purposes described.

In witness whereof I hereunto set my hand.

SAMUEL L. ALLEN.

Witnesses:
JOHN C. ALLEN, Jr.,
WM. H. ROBERTS.